(12) United States Patent
Waterfall et al.

(10) Patent No.: US 9,984,053 B2
(45) Date of Patent: May 29, 2018

(54) REPLICATING THE APPEARANCE OF TYPOGRAPHICAL ATTRIBUTES BY ADJUSTING LETTER SPACING OF GLYPHS IN DIGITAL PUBLICATIONS

(71) Applicant: Adobe Systems Incorporated, San Jose, CA (US)

(72) Inventors: Douglas Waterfall, Seattle, WA (US); Pooja Lnu, Uttar Pradesh (IN); Rahul Jain, New Delhi (IN); Sameer Manuja, Uttar Pradesh (IN)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 456 days.

(21) Appl. No.: 14/565,917

(22) Filed: Dec. 10, 2014

(65) Prior Publication Data

US 2016/0170941 A1 Jun. 16, 2016

(51) Int. Cl.
*G06F 17/22* (2006.01)
*G06F 17/21* (2006.01)
*G06F 17/30* (2006.01)

(52) U.S. Cl.
CPC ........ *G06F 17/2264* (2013.01); *G06F 17/214* (2013.01)

(58) Field of Classification Search
CPC .......................... G06F 17/2264; G06F 17/214
See application file for complete search history.

(56) References Cited

U.S. PATENT DOCUMENTS

2014/0108897 A1* 4/2014 Boutelle ............... G06F 17/227
715/201

* cited by examiner

*Primary Examiner* — Cesar Paula
*Assistant Examiner* — Konrad Kulikowski
(74) *Attorney, Agent, or Firm* — Finch & Maloney PLLC

(57) ABSTRACT

Techniques are disclosed for replicating the appearance of typographical attributes and text adornments in digital publications. Content in a fixed layout format is converted into a standard digital publication format by applying a <span> tag to each word of the content. Each <span> tag includes a CSS letter spacing attribute that is calculated based on the effective width of each glyph forming the word in the fixed layout format, and the default width of the same glyph in the digital publication format. In this manner, the corresponding word is rendered in approximately the same space in both the fixed layout and digital publication formats.

17 Claims, 10 Drawing Sheets

FIG. 5

Tennis is a racquet sport that can be played individually against a single opponent (singles) or between two teams of two players each (doubles). Each player uses a racquet that is strung with cord to strike a hollow rubber ball covered with felt over or around a net and into the opponent's court. The object of the game is to play the ball in such a way that the opponent is not able to play a good return. The opponent who is unable to return the ball will not gain a point, while the opposite opponent will.

Tennis is an Olympic sport and is played at all levels of society and at all ages. The sport can be played by anyone who can hold a racquet, including wheelchair users. The modern game of tennis originated in Birmingham, England, in the late 19th century as "lawn tennis". It had close connections both to various field ("▓▓▓") games such as croquet and ▓▓▓▓▓▓▓▓▓▓▓▓▓▓▓▓▓▓▓▓et sport of real ▓▓▓▓▓▓▓▓▓▓▓▓▓▓▓▓▓▓▓ntury in fact, the ▓▓▓▓▓▓▓▓▓▓▓▓▓▓is, not lawn ▓▓▓▓▓▓▓▓▓▓▓▓▓vel Sybil (1845), ▓▓▓▓▓▓▓▓▓▓▓hat he will "go down to Hampton Court and play tennis."

Dictionary lawn: an area of short, mown grass in a yard, garden or park.

FIG. 6

REPLICATING THE APPEARANCE OF TYPOGRAPHICAL ATTRIBUTES BY ADJUSTING LETTER SPACING OF GLYPHS IN DIGITAL PUBLICATIONS

FIELD OF THE DISCLOSURE

This disclosure relates to the field of data processing, and more particularly, to techniques for replicating the appearance of typographical attributes and text adornments in digital publications.

BACKGROUND

Electronic readers, or e-readers, generally are mobile electronic devices that can display book-length digital publications, such as books and periodicals. Electronic publishing data format standards provide publishers with a standardized set of rules and instructions for displaying digital publications on various e-reader devices. One such open standard is the Electronic Publication (EPUB) standard developed by the International Digital Publishing Forum (IDPF). Some existing standards, including EPUB, are primarily designed for re-flowable content, in which visual content (e.g., text and images) is automatically repositioned to fit the content into the size of the display window. For example, as the font or font size changes, an e-reader device may reflow text as necessary across pages so that the width of a line of text is no longer than the width of the screen, which eliminates the need to horizontally scroll across the page. However, some publishers may wish to publish an electronic publication in which the layout and position of visual content is fixed and does not re-flow. Cookbooks, travel books, photography books, children's books, and other image intensive books are examples of types of electronic publications where a fixed layout may be desirable. There are some existing third party plugins and tools available to create digital publications in which the layout is fixed and does not re-flow. However, such existing tools are unable to translate rich text formatting into a standardized fixed layout electronic publishing data format without altering the appearance of certain typography. For example, with some existing tools, translation of a fixed layout electronic publication into EPUB format causes the spacing between letters to increase or decrease. Such a change in letter spacing may cause the typography to appear improperly with respect to the intended layout. Thus, there is a need for improved techniques for generating fixed layout documents from richly-formatted content in which the appearance of the content is retained.

BRIEF DESCRIPTION OF THE DRAWINGS

The accompanying drawings are not intended to be drawn to scale. In the drawings, each identical or nearly identical component that is illustrated in various figures is represented by a like numeral.

FIG. 5 is an example of output data representing a portion of a fixed layout digital publication in a markup language, in accordance with an embodiment of the present invention.

FIG. 6 shows an example screenshot of a fixed layout digital publication as it appears in a GUI, in accordance with an embodiment of the present invention.

DETAILED DESCRIPTION

Figure 1:
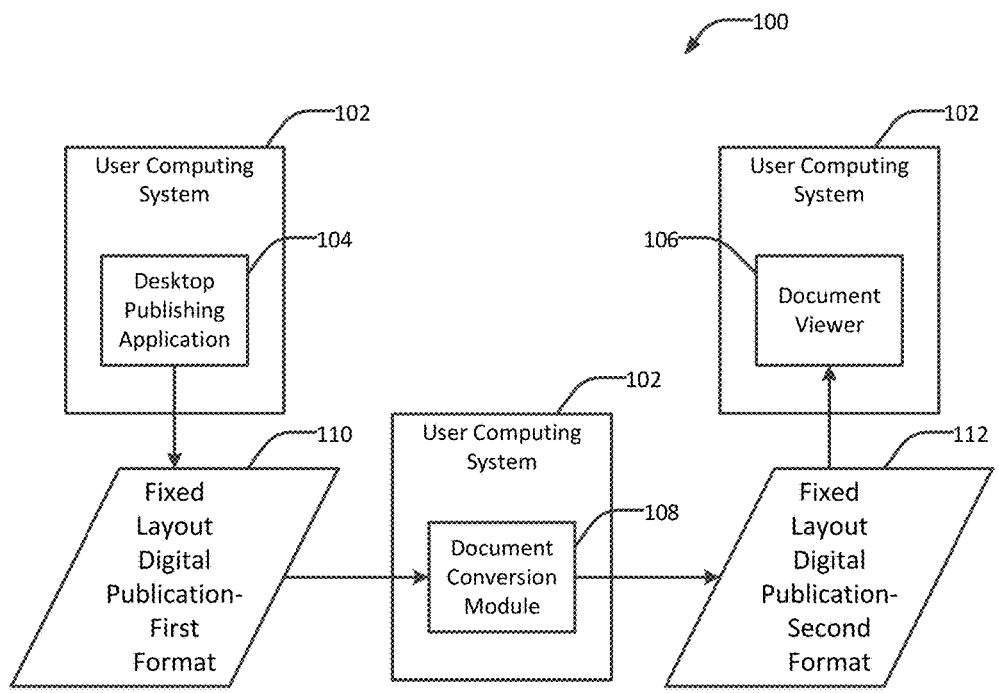
FIG. 1 shows an example system for replicating the appearance of typographical attributes and text adornments in digital publications, in accordance with an embodiment of the present invention.

Adobe InDesign is one example of a professional content authoring tool that can be used to create fixed layout content. It is possible to convert fixed layout content into a fixed layout electronic publication by rasterizing the text on each page and displaying the pages as a series of fixed images. However, rasterized text cannot be used for interactive operations, such as searching, bookmarking, highlighting and linking. Furthermore, existing techniques for generating fixed layout EPUB documents from richly-formatted content are unable to retain the same typography using the typography controls which are available in Hypertext Markup Language (HTML) and Cascading Style Sheets (CSS). As such, text repositioning or reflow results in poor typography.

To this end, and in accordance with an embodiment of the present invention, a technique is disclosed for replicating the appearance of typographical attributes and text adornments in digital publications. Content in a fixed layout format is converted into a standard digital publication format, such as EPUB 3, by applying a <span> tag to each word of the content. Each <span> tag includes a CSS letter spacing attribute that is calculated based on the effective width of each glyph forming the word in the fixed layout format, and the default width of the same glyph in the digital publication format. The CSS letter spacing attribute is used to adjust the spacing between glyphs in a word, including increasing and decreasing the spacing such that the corresponding word is rendered in approximately the same space in both the fixed layout and digital publication formats. CSS letter spacing values are calculated based on the accumulated difference between the effective glyph width in the fixed layout format and default width of the glyph in the digital publication format. The letter spacing applied in the <span> tag is a function of the accumulated difference in glyph widths divided by the number of glyphs in the word. In this manner, the appearance of the typography and associated style attributes are replicated when converting from a digital publication to a fixed page layout format, such as EPUB or HTML. Furthermore, the converted publication retains text that is not rasterized and therefore searchable and can be linked to dictionary definitions or other resources, such as those retrievable via hyperlinks. Numerous configurations and variations will be apparent in light of this disclosure.

As used in this disclosure, the term "digital publication" refers to at least a portion of a document in electronic form. A document is a piece of communication including graphics, text, images or any combination of these. Examples of digital publications include books, magazines, newsletters, memos, web pages, brochures, pamphlets, catalogs, posters and advertisements.

As used in this disclosure, the term "glyph" refers to a symbol used in the visual representation of a single character (e.g., "f") or several adjacent characters (e.g., "fi"). Each glyph has a width that may include a fixed amount of white space on one or more sides of the symbol. The width of a glyph can be measured in pixels or other suitable units. In some alphabets, a character may have multiple glyphs (e.g., upper and lowercase versions of the same character, or where the characters are represented by several different typographical fonts). Used in combination, glyphs can be used to spell words or give meaning to what is written (e.g., accent marks, punctuation marks, and the like). Generally, text is formed from a sequence of glyphs.

As used in this disclosure, the term "effective glyph width" refers to the width of a glyph as it appears in a fixed layout including the effect of kerning, tracking and any other attributes that affect the position and spacing between adjacent glyphs. In digital typography, kerning represents an amount by which the default character spacing between adjacent glyphs is increased or decreased. Tracking refers to a consistent degree of increase or decrease of space between letters of a word or block of text. The effective glyph width may, for example, be measured in pixels taking into account the actual width of the glyph plus any increases (or decreases) in the default spacing between characters that occur in a given fixed layout.

As used in this disclosure, the terms "fixed layout" and "fixed page layout" refer to a data format in which the text, images, graphics and other visual elements appear in fixed positions with respect to a given page of the publication and do not re-flow between lines or pages. A fixed page layout is intended to appear substantially the same regardless of the medium on which it is provided. For example, a fixed page layout will not change appearance when the size of a window in which it is displayed is enlarged.

Example System

FIG. 1 shows an example system 100 for replicating the appearance of typographical attributes and text adornments in digital publications, in accordance with an embodiment. The system 100 includes one or more user computing systems 102, a desktop publishing application 104, a document viewing application 106, and a document conversion module 108. The desktop publishing application 104, the document viewing application 106, and the document conversion module 108 can each be executed by any one or more of the user computing systems 102. In cases where the system 100 includes more than one user computing system 102, such user computing systems can be interconnected to a wired or wireless data communications network (e.g., the Internet or an intranet). The desktop publishing application 104 is configured to generate and provide a fixed layout digital publication in a first page layout format 110. An example of a fixed layout digital publication is described in further detail with respect to FIG. 2. In some cases, the fixed layout digital publication can reside on a cloud-based computing system. The desktop publishing application 104 may include, for example, Adobe InDesign®, which can be used to create electronic documents, such as books, brochures, newspapers and magazines that have a fixed page layout. The document conversion module 108 is configured to convert the fixed layout digital publication from a first page layout format 110 to a second page layout format 112 that is different than the first page layout format, such as described in further detail with respect to FIG. 4. For example, the first page layout format 110 may include an InDesign INDD file format or other page layout file format. The second page layout format 112 may be in an EPUB 3 fixed layout book format, an HTML web page format, or any other markup language document format. The document conversion module 108 may, for example, be integrated into the desktop publishing application 104, provided as an application programming interface (API), provided as a service (e.g., a cloud-based service), provided as a browser plug-in, or any combination of these. The document viewing application 106 is configured to receive and display the fixed layout digital publication in the second page layout format 112. Examples of the document viewing application 106 include an EPUB 3 compatible book reader (e.g., Barnes and Noble Nook®, Amazon Kindle®, etc.) or a web browser (e.g., Firefox, Internet Explorer, Chrome, Opera, and Safari).

Example Graphical User Interface and Fixed Layout Format

Figure 2:
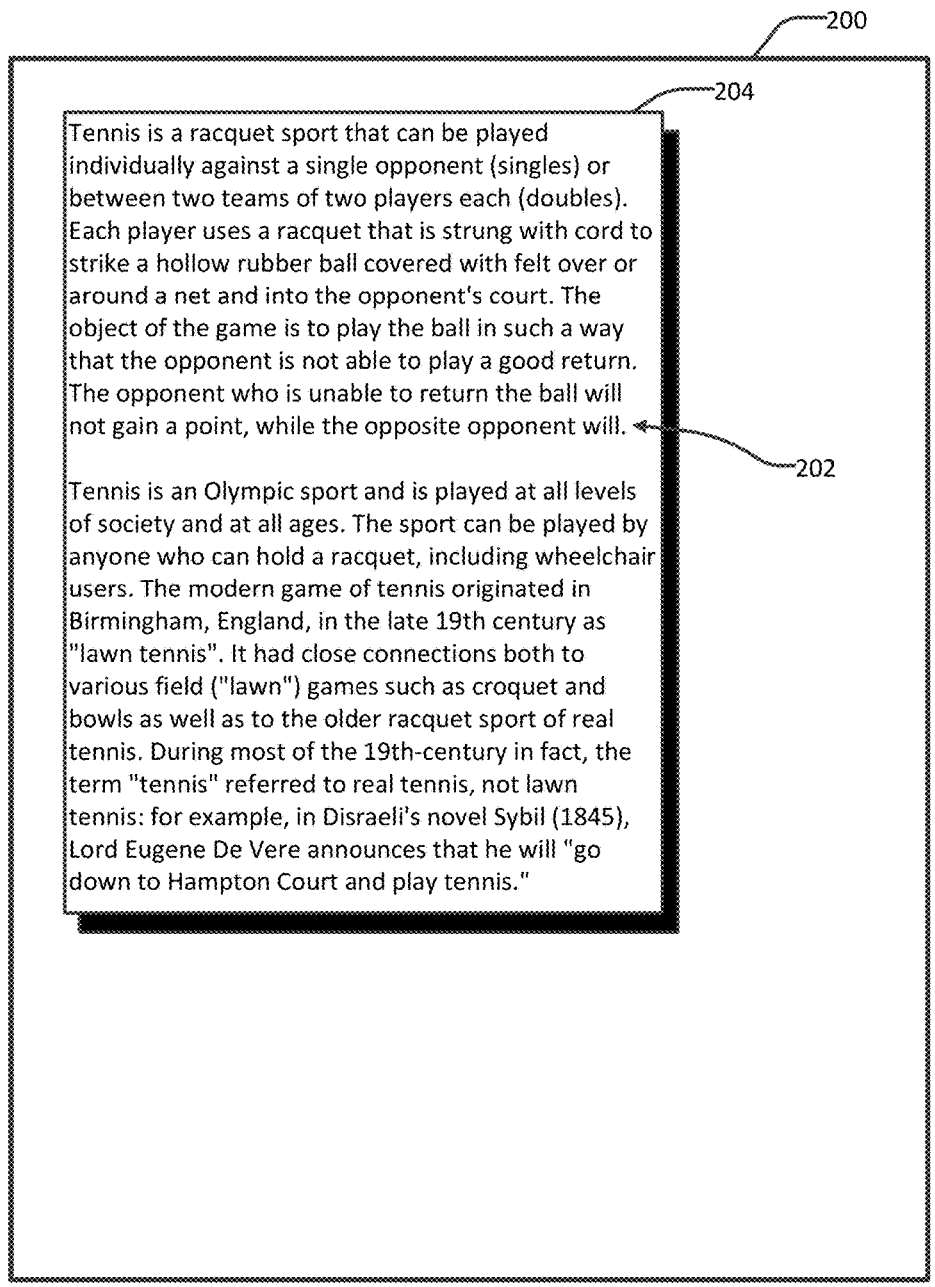
FIG. 2 shows an example screenshot of a fixed layout digital publication as it appears in a graphical user interface (GUI), in accordance with an embodiment of the present invention.

FIG. 2 shows a screenshot of an example fixed layout digital publication as it appears in a graphical user interface (GUI) 200, in accordance with an embodiment. The publication can include any type of content, such as text, images and graphics. Existing authoring tools, such as Adobe InDesign, allow users to create digital publications like the example shown in FIG. 2 with page designs and typography that are formatted in fixed relation to the pixels (or other reference points) of the layout. However, existing plugins and tools for converting such fixed layout publication to other formats, such as EPUB and HTML, cannot replicate the pixel perfect formatting needed to replicate the appearance of the original publication in those formats. One limitation of some existing conversion tools is that the available typography controls in HTML (e.g., Cascading Style Sheets or CSS) can cause text repositioning or reflow, in which the arrangement of text is variably adjusted to fit the width of the viewing window as the window is resized. This causes poor quality typography when the original fixed layout is converted into another format. Another limitation of some existing conversion tools is that such tools rasterize the text during the conversion between formats. Rasterized text is generally not interactively selectable or searchable within the user interface.

Referring to the example of FIG. 2, the publication includes text 202 positioned within a text frame 204. The position of the text 202 and the size of the text frame 204 are fixed in relation to each other such that the publication maintains the same appearance regardless of the size of the viewing window in the GUI 200. For instance, in this example, the first line of text 202 always begins with the word "Tennis" and the second line of text 202 always begins with the word "individually" when the publication is viewed in the GUI 200. The fixed positions of the text 202, and individual glyphs that form the text, depend in part on the width of each glyph and the spacing between each glyph, as demonstrated in the example of FIG. 3.

Figure 3:
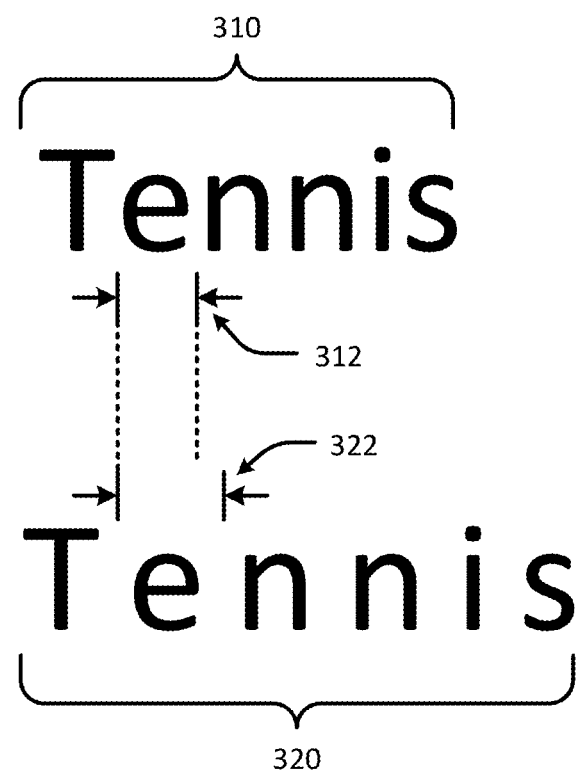
FIG. 3 shows examples of a portion of the fixed layout digital publication of FIG. 2.

FIG. 3 shows examples of a portion of the fixed layout digital publication of FIG. 2. In particular, the first word of the first line of the publication, "Tennis", is depicted as a series of glyphs, "T", "e", "n", "n", "i", and "s". Each glyph can include white space on either side of the glyph. Such white space, although generally invisible, is considered part of the glyph and distinct from additional letter spacing between adjacent glyphs, if any. In a fixed layout format, the width of each glyph in a given word is constant. However, the width of a given glyph in one page layout format (e.g., a fixed layout book or brochure) may be different from the width of the same glyph in a different page layout format (e.g., EPUB or HTML). For example, glyph "e" in the format indicated at 310 has a width 312, which is narrower than the width 322 of glyph "e" in the format indicated at 320.

To this end, in accordance with an embodiment of the present invention, during conversion of a digital publication from a first page layout format to a different, second page layout format, the letter spacing between glyphs (as opposed to the glyph width) is automatically adjusted to compensate for any differences between the widths of glyphs in the different page layout formats. Such adjustment of the letter spacing effectively replicates the appearance of typographical attributes and text adornments in digital publication across different page layout formats.

Example Methodology

Figure 4:
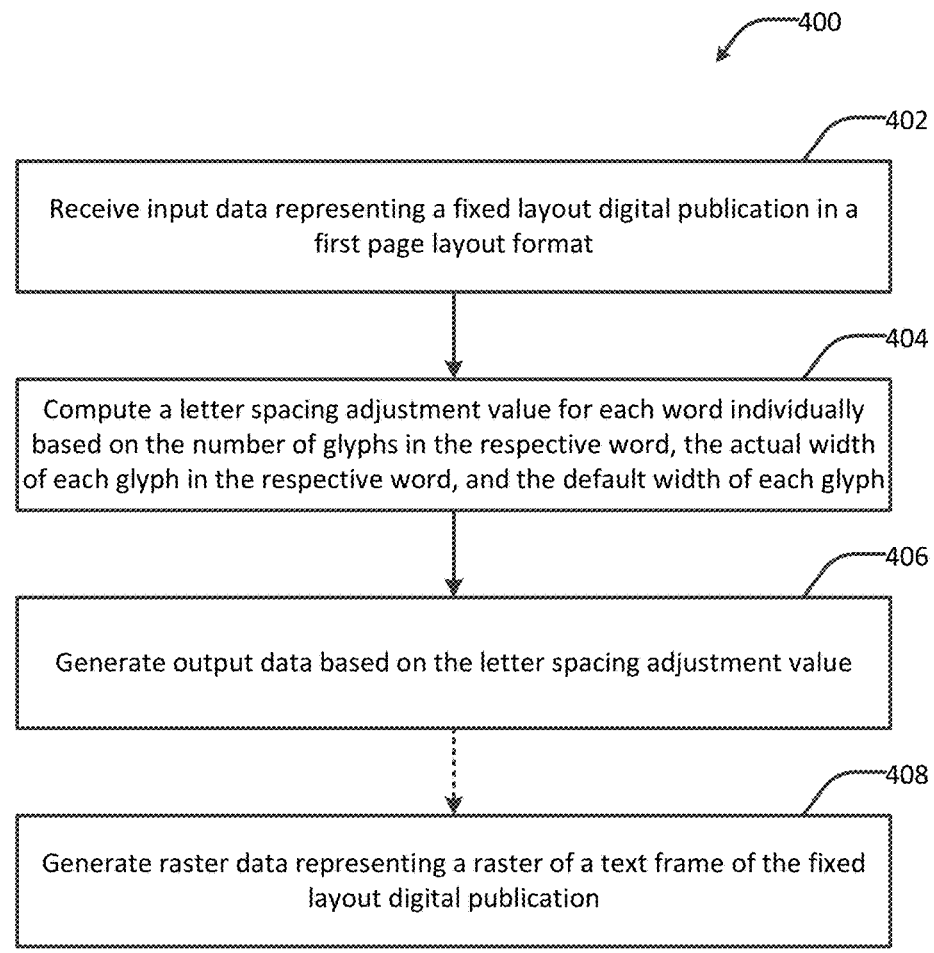
FIG. 4 is a flow diagram of an example methodology for replicating the appearance of typographical attributes and text adornments in digital publications, in accordance with an embodiment of the present invention.

FIG. 4 is a flow diagram of an example methodology 400 for replicating the appearance of typographical attributes and text adornments in digital publications, in accordance with an embodiment. The method 400 may be performed, for example, in whole or in part by the document conversion module 108 of FIG. 1. The method 400 begins by receiving 402 input data representing a fixed layout digital publication in a first page layout format. The fixed layout digital publication includes a plurality of words. In some cases, several words can be combined with spaces to form a phrase. Each word or phrase is formed by a series of glyphs, each glyph having an effective width associated with the first page layout format and a default width associated with a second page layout format that is different than the first page layout format. In some embodiments, the first format is an Adobe InDesign Document format (INDD) or other fixed page layout format. In some embodiments, the second format is EPUB 3, HTML, XML, or other suitable digital publication format. The effective width of a given glyph may be different (narrower or wider) than the default width of the same glyph. In some embodiments, the receiving 402 further includes receiving an output format that the input data is to be converted into. In some embodiments, the method 400 includes identifying words based on the input data, identifying glyphs in one or more of the words, determining the effective width of each glyph, or any combination of these.

The method 400 continues by computing 404 a letter spacing adjustment value for each word or phrase individually based on the number of glyphs in the respective word or phrase, the effective width of each glyph in the respective word or phrase, and the default width of each glyph. In some embodiments, the letter spacing adjustment value is a function of the sum of the differences between the effective width of all glyphs in a given word or phrase and the default width of all such glyphs, the sum being divided by the number of glyphs in the word or phrase. The method 400 continues by generating 406 output data based on the letter spacing adjustment value. The output data represents the fixed layout digital publication in the second page layout format such that the width of each glyph is the default width adjusted by the letter spacing adjustment value on a word-by-word or phrase-by-phrase basis.

In some embodiments, the method 400 includes generating a <span> tag associated with each word, where the output data includes the <span> tag. An example of such a <span> tag is shown and described with respect to FIG. 5.

In some embodiments, the method 400 includes assigning the letter spacing adjustment value to a Cascading Style Sheet (CSS) letter-spacing attribute associated with each respective word, where the output data includes the CSS letter-spacing attribute. In some embodiments, such as described in further detail with respect to FIGS. 7, 8 and 9, the method 400 includes generating 408 raster data representing a raster of a text frame of the fixed layout digital publication, where the output data includes the raster data. In such cases, the raster excludes the words, but may include other elements, such as a footnote, a paragraph rule, and an underline.

Additional Examples

Figure 5:
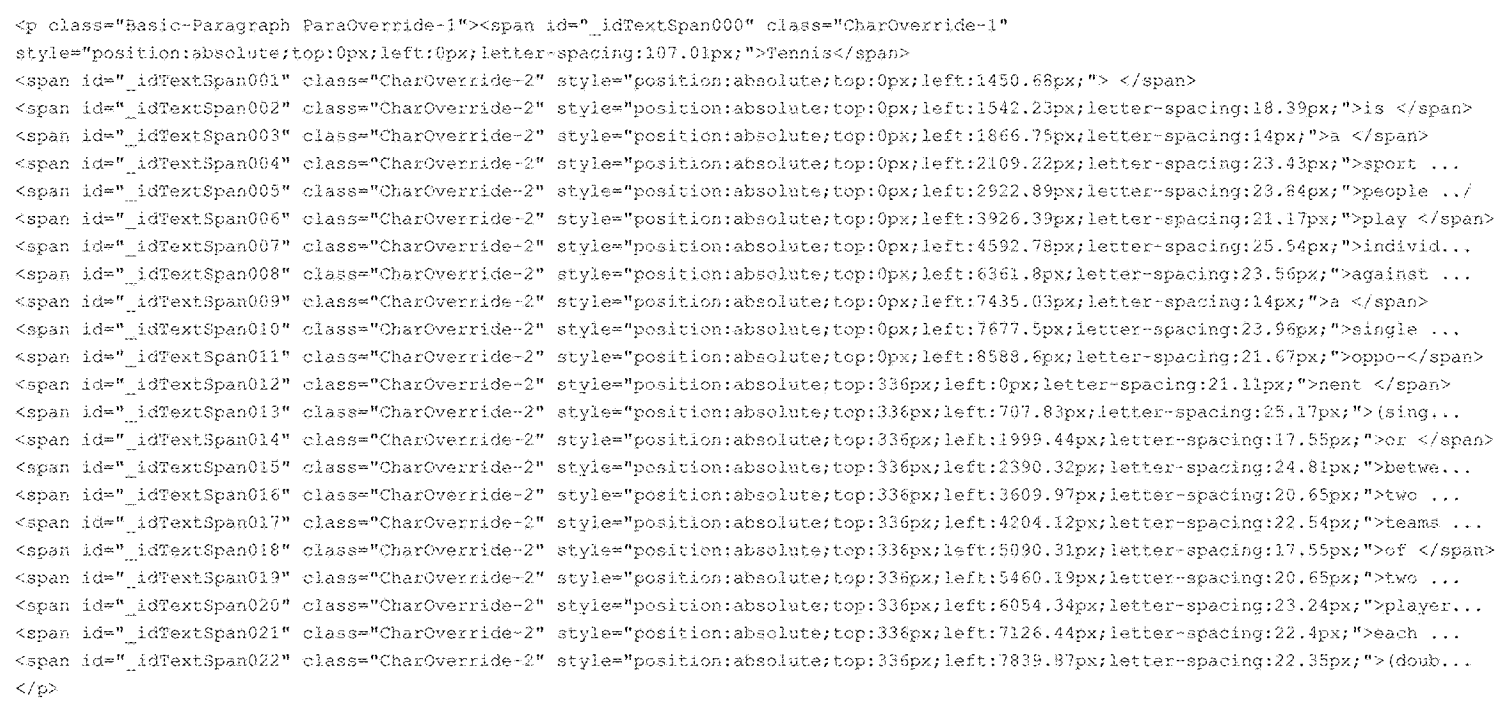

FIG. 5 is an example of output data representing a portion of a fixed layout digital publication in a markup language, in accordance with an embodiment. A markup language is a technique for annotating a document in a way that is syntactically distinguishable from human-readable text in the document. Such annotations are referred to as so-called tags, which are used to apply meaning or formatting to the content. There are several existing markup languages, such as HyperText Markup Language (HTML), which is a structured markup language for publishing web pages. HTML markup includes code that has a particular meaning to an application (e.g., a web browser or electronic book reader) that processes the file. An HTML browser, such as Internet Explorer, displays the information in an HTML file based on the markup.

Referring to FIG. 5, the markup in the output data represents the digital publication in a particular format, such as EPUB 3, XML or HTML. In this example, a <span> tag is assigned to each word of the digital publication, along with a corresponding CSS-style 'letter-spacing' variable that represents the letter spacing adjustment value described with respect to FIG. 4. As can be seen, each word has a separate <span> tag and a unique letter spacing adjustment value. When the output data is rendered by an application configured to process the markup (e.g., the document viewer 106 of FIG. 1), the application replicates the appearance of the typographical attributes and text adornments of the original digital publication prior to conversion of the page layout format. The example markup shown in FIG. 5 is easy to interpret because the <span> tags are applied on a word-by-word basis. The word-by-word approach according to various embodiments further allows each word to be contiguous for providing so-called live text words, such as described with respect to FIG. 6.

Referring to the examples of FIGS. 3 and 5, a markup of the word "Tennis" includes a letter spacing adjustment value of 107.01 pixels. When applied to the text "Tennis," the letter spacing adjustment value results in the effective width of each glyph in the word indicated at 320 in FIG. 3, where the word indicated at 310 is rendered using the default widths of each glyph. The letter spacing adjustment value is the average of the differences between the effective width of each glyph in a word and the default width of each glyph in the word. Thus, the letter spacing adjustment value can be calculated by adding together the differences between the effective width of each glyph (e.g., the width 322 of FIG. 3) and the default width of each glyph (e.g., the width 312 in FIG. 3), and dividing the sum of the differences by the number of glyphs (e.g., six glyphs). For instance, the effective width of each glyph in the word "Tennis" may be 228.65, 157.01, 157.01, 157.01, 130.57 and 157.01 pixels, respectively. The default width of each glyph in the word "Tennis" may be 120.20, 50, 50, 50, 25 and 50 pixels, respectively. Thus, the differences between the effective width of each glyph and the default width are 108.45, 107.01, 107.01, 107.01, 105.57 and 107.01 pixels, respectively. The sum of these differences is 642.06 pixels, which when divided by six glyphs results in 107.01 pixels. The resulting letter adjustment value of 107.01 pixels for the word "Tennis" is shown in the second line of text in FIG. 5 (e.g., "letter-spacing: 107.01px").

FIG. 6 shows an example screenshot of a fixed layout digital publication as it appears in a graphical user interface (GUI), in accordance with an embodiment. The digital publication includes one or more so-called live text words, which are words that can be interactively selected using an input device, such as a mouse. The structure of the output data described with respect to FIG. 5 can include code for performing additional functions when selected by a user. Such additional functions include, for example, providing dictionary definitions of words selected by the user via an input device (e.g., mouse), and providing hyperlinks that when selected by the user via an input device (e.g., mouse) cause a web page or other resource to be accessed and retrieved. In this example, the word "lawn" is highlighted, and dictionary definition of the word "lawn" is displayed in a balloon or pop-up window. In some cases, live text words can serve as hyperlinks to other content within the digital publication or in other sources (e.g., other documents, forms, applications, databases, web pages, cloud data storage services, etc.).

Figure 7:
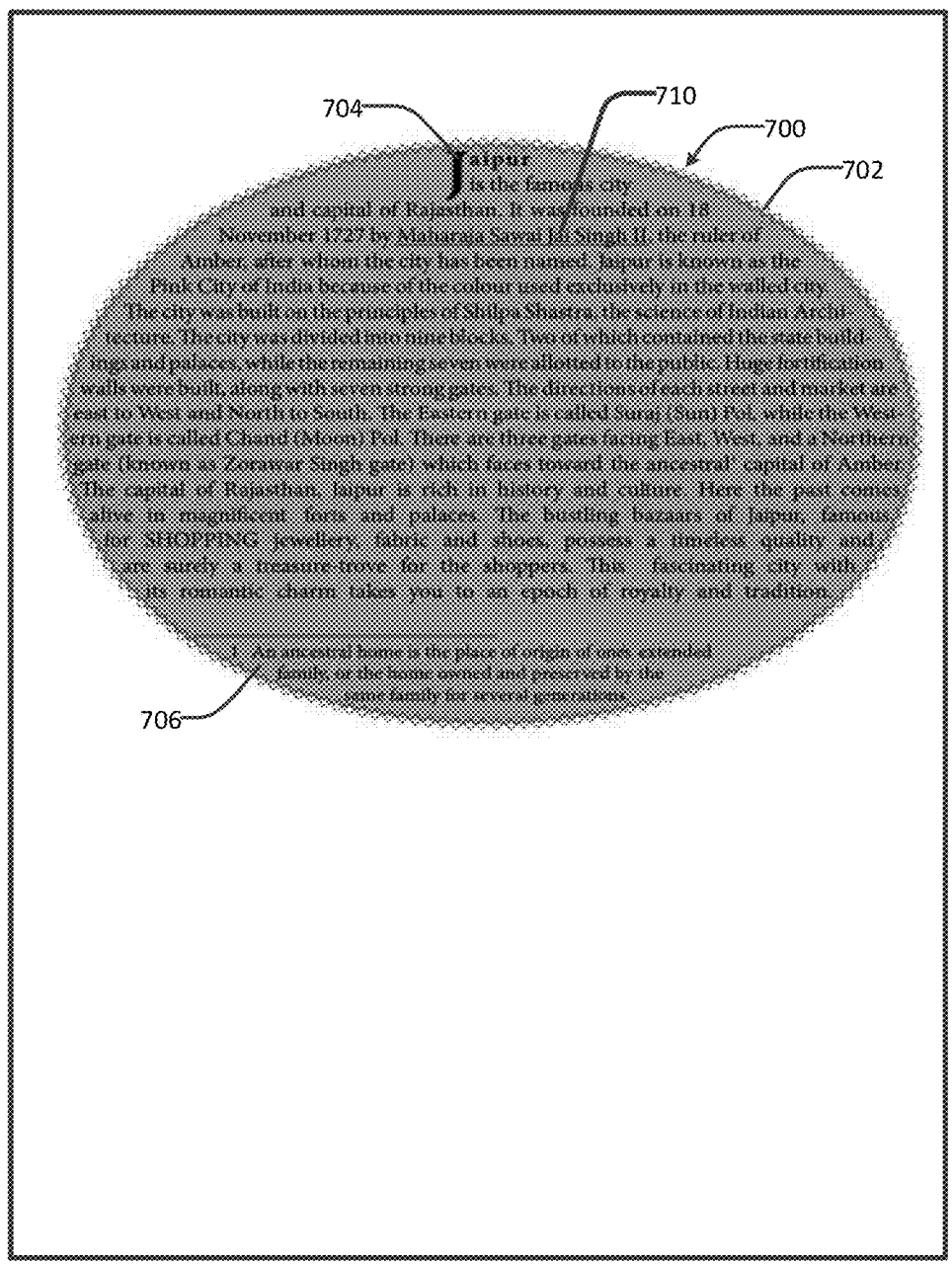
FIG. 7 shows an example screenshot of another fixed layout digital publication as it appears in a GUI, in accordance with an embodiment of the present invention.

FIG. 7 shows an example screenshot of another fixed layout digital publication as it appears in a graphical user interface (GUI), in accordance with an embodiment. In this example, the fixed layout digital publication includes a non-rectangular text frame 700, and the digital publication includes a stroke style that does not have corresponding CSS property equivalent for border-style (e.g., the border 702 of the text frame 700 has a "White Diamond" stroke style applied on the frame, the text has drop caps 704, a footnote 706, a paragraph rule (text justified to left and right margins), and an underline 710). Since the stroke style is not supported by EPUB, the appearance of the stroke style is replicated by generating a text frame raster that includes the stroke style and overlaying the text frame raster with non-rasterized typography. Thus, in accordance with an embodiment, to match the appearance of the digital publication (e.g., in an EPUB or HTML format) without rasterizing the text, a raster of text frame with all the attributes other than text is formed. The text frame raster can include non-text elements, such as paragraph rules, strike through, bullets and numbering. The text frame raster is used as a background image, and text is positioned over the background image using a technique such as described with respect to FIGS. 4 and 5. In this manner, the user will not lose any of the attributes or stroke styles when converting from a digital publication to a fixed page layout format, such as EPUB or HTML.

Figure 8:
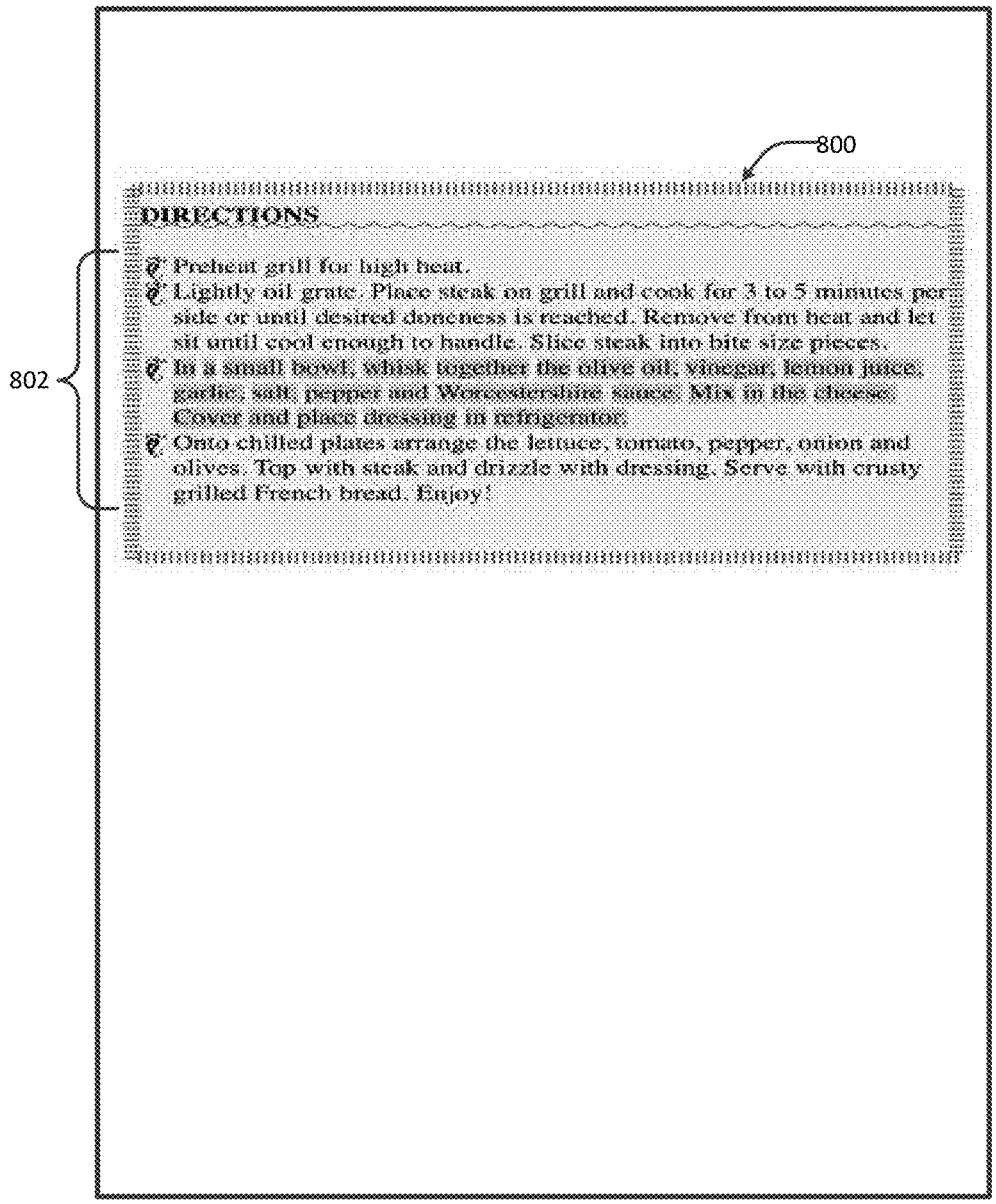
FIG. 8 shows an example screenshot of another fixed layout digital publication as it appears in a GUI, in accordance with an embodiment of the present invention.

FIG. 8 shows an example screenshot of another fixed layout digital publication as it appears in a graphical user interface (GUI), in accordance with an embodiment. In this example, the fixed layout digital publication includes a text frame 800 text with a bulleted list 802. The bullet used does not have a CSS equivalent of in the list-style-type property. Since the bullet is not supported by EPUB, the appearance of the bullet is replicated by generating a text frame raster that includes the bullet and overlaying the text frame raster with non-rasterized typography. Thus, in accordance with an embodiment, a raster of text frame with all the attributes other than text is formed to match the appearance of the digital publication (e.g., in an EPUB or HTML format) without rasterizing the text frame fully. The text frame raster can include non-text elements, such as paragraph rules, strike through, bullets and numbering. The raster is used as a background image, and text is positioned over the background image using a technique such as described with respect to FIGS. 4 and 5. In this manner, the user will not lose any of the attributes or stroke styles when converting from a digital publication to a fixed page layout format, such as EPUB or HTML.

Figure 9:
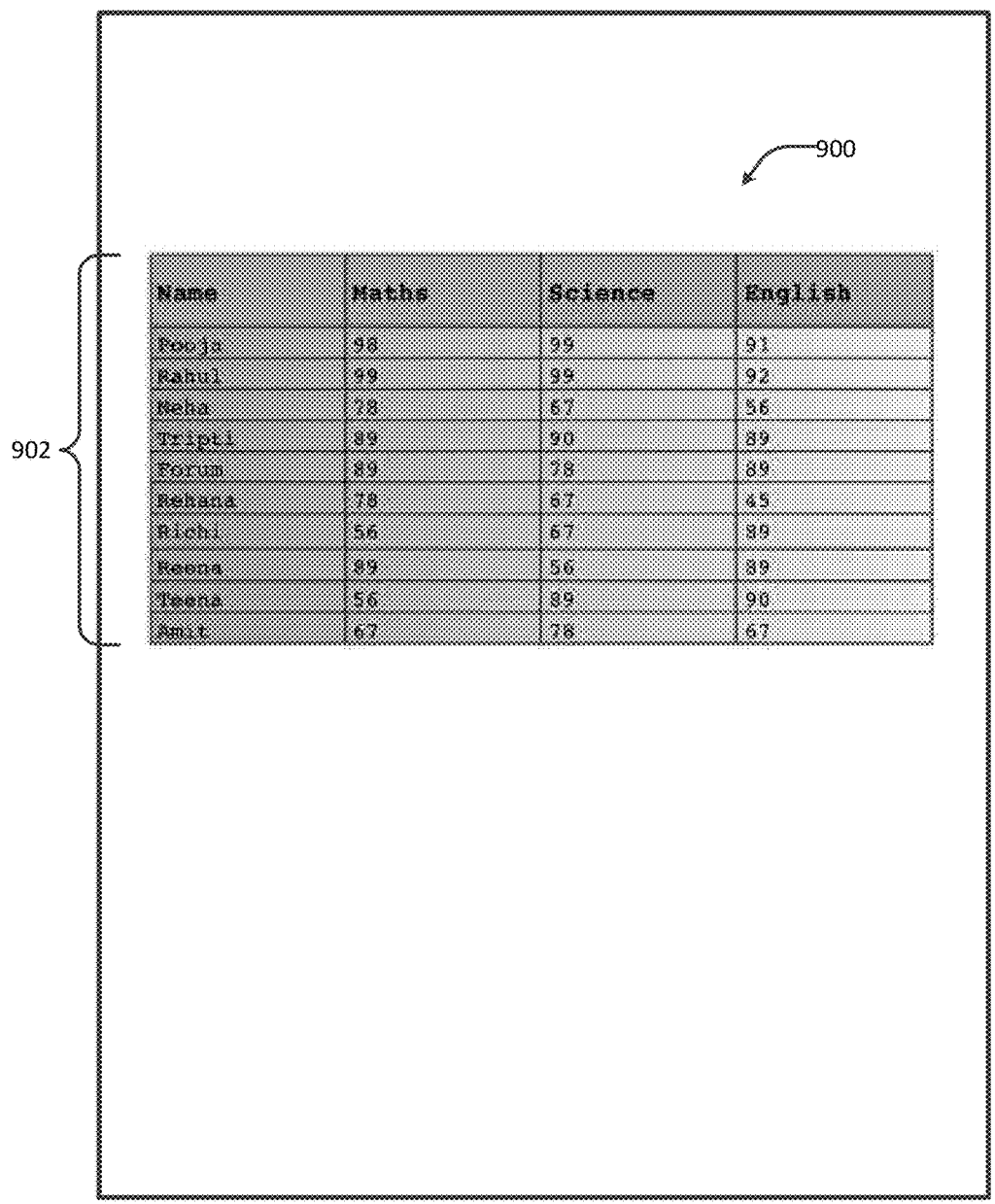
FIG. 9 shows an example screenshot of another fixed layout digital publication as it appears in a GUI, in accordance with an embodiment of the present invention.

FIG. 9 shows an example screenshot of another fixed layout digital publication as it appears in a graphical user interface (GUI), in accordance with an embodiment. In this example, the fixed layout digital publication includes a text frame 900 having a table 902 with a gradient fill in the cells. Since the gradient fill is not supported by EPUB, the appearance of the gradient fill is replicated by generating a text frame raster that includes the gradient fill and overlaying the text frame raster with non-rasterized typography. Thus, in accordance with an embodiment, to match the appearance of the digital publication (e.g., in an EPUB or HTML format) without rasterizing the text frame background, a raster of text frame with all the attributes other than text is formed. The text frame raster can include non-text elements, such as the table grid and gradient fill. The raster is used as a background image, and text is positioned over the background image using a technique such as described with respect to FIGS. 4 and 5. In this manner, the user will not lose any of the attributes or stroke styles when converting from a digital publication to a fixed page layout format, such as EPUB or HTML.

Example Computing Device

Figure 10:
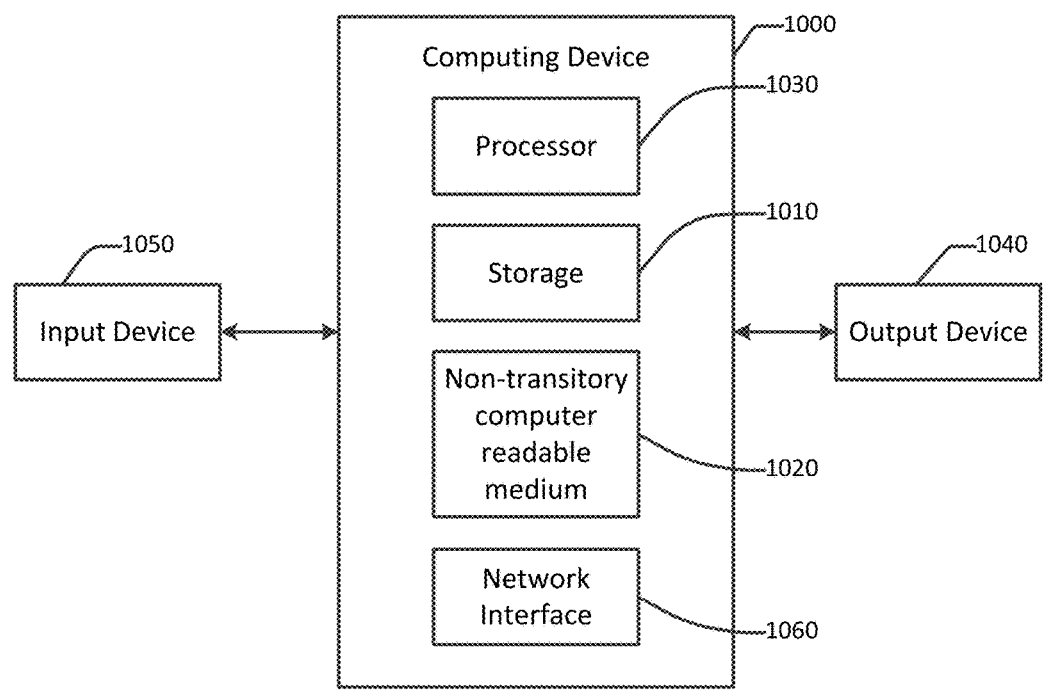
FIG. 10 is a block diagram representing an example computing device that may be used in accordance with an embodiment of the present invention.

FIG. 10 is a block diagram representing an example computing device 1000 that may be used to perform any of the techniques as variously described in this disclosure. For example, the user computing system, the desktop publishing application, the document conversion module, the document viewer, or any combination of these may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals, such as a camera 1052. The computing device 1000 can include and/or be operatively coupled to various suitable devices for performing one or more of the functions as variously described in this disclosure.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system shown in FIG. 1, such as the desktop publishing application 104, the document conversion module 108, the document viewer 106, or any combination of these, can be implemented in software, such as a set of instructions (e.g., HMTL, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. As used in this disclosure, the terms "non-transient" and "non-transitory" exclude transitory forms of signal transmission. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment, including the computing device 1000, can be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described in this disclosure can be combined in any number of configurations. One example embodiment provides a system including a storage having at least one memory, and one or more processors each operatively coupled to the storage. The one or more processors are configured to carry out a process including receiving, by a processor, input data representing a fixed layout digital publication in a first page layout format, the fixed layout digital publication including a plurality of words, each word being formed by a series of glyphs, each glyph having an effective width associated with the first page layout format and a default width associated with a second page layout format that is different than the first page layout format; computing, by the processor, a letter spacing adjustment value for each word individually based on the number of glyphs in the respective word, the effective width of each glyph in the respective word, and the default width of each glyph; and generating, by the processor, output data based on the letter spacing adjustment value, the output data representing the fixed layout digital publication in the second page layout format such that the width of each glyph is the default width adjusted by the letter spacing adjustment value on a word-by-word basis. In some cases, the letter spacing adjustment value is computed as a function of a sum of the differences between the effective width of all glyphs in the respective word and the default width of all the glyphs in the respective word, the sum being divided by the number of glyphs in the respective word. In some cases, the second format is EPUB 3 or HTML. In some cases, the process includes generating a <span> tag associated with each word, where the output data includes the <span> tag. In some cases, the process includes assigning the letter spacing adjustment value to a Cascading Style Sheet (CSS) letter-spacing attribute associated with each respective word, where the output data includes the CSS letter-spacing attribute. In some cases, the process includes generating raster data representing a raster of a text frame of the fixed layout digital publication, the raster excluding the plurality of words, where the output data includes the raster data. In some such cases, the raster includes a footnote, a paragraph rule, an underline, or any combination of these. Another embodiment provides a non-transient computer-readable medium or computer program product having instructions encoded thereon that when executed by one or more processors cause the processor to perform one or more of the functions defined in the present disclosure, such as the methodologies variously described in this paragraph. In some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method comprising:
   receiving, by a processor, input data representing a fixed layout digital publication in a first page layout format, the fixed layout digital publication including a plurality of words, each word being formed by a series of glyphs, each glyph having an effective width associated with the first page layout format and a default width associated with a second page layout format that is different than the first page layout format;
   computing, by the processor, a letter spacing adjustment value for each word individually based on the number of glyphs in the respective word, the effective width of each glyph in the respective word in the first page layout format, and the default width of each glyph in the second page layout format; and
   generating, by the processor, output data representing the fixed layout digital publication in the second page layout format by assigning the letter spacing adjustment value to a Cascading Style Sheet (CSS) 'letter-spacing' property associated with all of the glyphs in each respective word, such that the spacing between each glyph is the default width associated with the second page layout format adjusted by the letter spacing adjustment value on a word-by-word basis.

2. The method of claim 1, wherein the letter spacing adjustment value is computed as a function of a sum of the differences between the effective width of all glyphs in the respective word and the default width of all the glyphs in the respective word, the sum being divided by the number of glyphs in the respective word.

3. The method of claim 1, wherein the second format is one of EPUB 3 and HTML.

4. The method of claim 1, wherein the generating further comprises generating a <span> tag associated with each word, wherein the output data includes the <span> tag.

5. The method of claim 1, further comprising generating raster data representing a raster of a text frame of the fixed layout digital publication, the raster excluding the plurality of words, wherein the output data includes the raster data.

6. The method of claim 5, wherein the raster includes at least one of a footnote, a paragraph rule, and an underline.

7. A system comprising:
   a storage; and
   a processor operatively coupled to the storage, the processor configured to execute instructions stored in the storage that when executed cause the processor to carry out a process comprising:
   receiving, by the processor, input data representing a fixed layout digital publication in a first page layout format, the fixed layout digital publication including a plurality of words, each word being formed by a series of glyphs, each glyph having an effective width associated with the first page layout format and a default width associated with a second page layout format that is different than the first page layout format;
   computing, by the processor, a letter spacing adjustment value for each word individually based on the number of glyphs in the respective word, the effective width of each glyph in the respective word in the first page layout format, and the default width of each glyph in the second page layout format; and
   generating, by the processor, output data representing the fixed layout digital publication in the second page layout format by assigning the letter spacing adjustment value to a Cascading Style Sheet (CSS) 'letter-spacing' property associated with all of the glyphs in each respective word, such that the spacing between each glyph is the default width associated with the second page layout format adjusted by the letter spacing adjustment value on a word-by-word basis.

8. The system of claim 7, wherein the letter spacing adjustment value is computed as a function of a sum of the differences between the effective width of all glyphs in the respective word and the default width of all the glyphs in the respective word, the sum being divided by the number of glyphs in the respective word.

9. The system of claim 7, wherein the second format is one of EPUB 3 and HTML.

10. The system of claim 7, wherein the process includes generating a <span> tag associated with each word, and wherein the output data includes the <span> tag.

11. The system of claim 7, wherein the process includes generating raster data representing a raster of a text frame of the fixed layout digital publication, the raster excluding the plurality of words, and wherein the output data includes the raster data.

12. The system of claim 11, wherein the raster includes at least one of a footnote, a paragraph rule, and an underline.

13. A non-transitory computer program product having instructions encoded thereon that when executed by one or more processors cause a process to be carried out, the process comprising:
   receiving, by the one or more processors, input data representing a fixed layout digital publication in a first page layout format, the fixed layout digital publication including a plurality of words, each word being formed by a series of glyphs, each glyph having an effective width associated with the first page layout format and a default width associated with a second page layout format that is different than the first page layout format;
   computing, by the one or more processors, a letter spacing adjustment value for each word individually based on the number of glyphs in the respective word, the effective width of each glyph in the respective word in the first page layout format, and the default width of each glyph in the second page layout format; and
   generating, by the one or more processors, output data representing the fixed layout digital publication in the second page layout format by assigning the letter spacing adjustment value to a Cascading Style Sheet (CSS) 'letter-spacing' property associated with all of the glyphs in each respective word, such that the spacing between each glyph is the default width associated with the second page layout format adjusted by the letter spacing adjustment value on a word-by-word basis.

14. The non-transitory computer program product of claim 13, wherein the letter spacing adjustment value is computed as a function of a sum of the differences between the effective width of all glyphs in the respective word and the default width of all the glyphs in the respective word, the sum being divided by the number of glyphs in the respective word.

15. The non-transitory computer program product of claim 13, wherein the second format is one of EPUB 3 and HTML.

16. The non-transitory computer program product of claim 13, further comprising generating a <span> tag associated with each word, wherein the output data includes the <span> tag.

17. The non-transitory computer program product of claim 13, wherein the process includes generating raster data representing a raster of a text frame of the fixed layout digital publication, the raster excluding the plurality of words, wherein the output data includes the raster data.

\* \* \* \* \*